Patented Feb. 27, 1951

2,543,407

UNITED STATES PATENT OFFICE 2,543,407

PROCESS FOR RECOVERY OF CALCIUM IN ADMIXTURE WITH SODIUM

Eugene F. Hill and Harold Soroos, Detroit, Mich., assignors to Ethyl Corporation, New York, N. Y., a corporation of Delaware No Drawing. Application May 10, 1949, Serial No. 92,516

5 Claims. (Cl. 75—97)

This invention relates to a process for the recovery of calcium from mixtures containing calcium and sodium. This invention relates also to a process of making sodium alcoholates from such mixtures. More particularly our invention is directed toward the recovery of the calcium metal contained in sludges formed in electrolytic processes for the manufacture of sodium from a mixture of sodium and calcium chlorides.

In the production of sodium by electrolysis of fused sodium chloride, calcium chloride is added to the electrolyte in order to lower its melting point. During the electrolysis calcium metal, as well as sodium, is produced at the cathode, and at the temperature of operation dissolves in the sodium melt. When this solution is removed from the cell and cools, most of the calcium crystallizes out. This crude sodium mixture containing the calcium metal is purified, usually by mechanical separation, and most of the sodium recovered therefrom. The residue or sludge obtained from such separation consists of a mixture of solids containing crystals of calcium embedded in a matrix of sodium and it also contains impurities such as sodium and calcium oxides and chlorides. The total amount of metals in the residue varies but in general it is from 90 to 95 per cent. The amount of calcium contained therein is generally between 15 and 30 per cent.

It is an object of this invention to provide a process for economically recovering calcium metal from admixtures with sodium. A more specific object is to recover calcium substantially free of sodium metal from a sludge material containing sodium and calcium. A further object is to recover sodium from such a mixture in the form of sodium alcoholate which is a valuable commercial product. Another and important object is to provide a process for recovery of calcium from such mixtures, which has considerable flexibility in operation and in the design of the equipment used.

We accomplish these objects by treating a mixture of calcium and sodium metals with a lower aliphatic alcohol in the presence of water. Among the lower alcohols which we have successfully employed are methyl, ethyl, n-propyl, and isopropyl alcohols; the various butyl alcohols including primary butyl, secondary butyl and tertiary butyl; and the various amyl alcohols.

Calcium can be separated from admixture with sodium by using anhydrous alcohols. However with anhydrous alcohols the process requires careful control with respect to time and temperature, and requires the use of carefully designed equipment. Time is particularly important when anhydrous alcohols are used because if the calcium is left in contact too long with the alcohol it will react vigorously and the metal cannot be recovered in substantial amounts. Also with anhydrous alcohols the process must be carried out at relatively low temperatures in order to have sufficient time to withdraw the calcium from the system before it reacts. However, by conducting the process in the presence of water according to our invention, a less sensitive system is obtained thus allowing greater flexibility in the commercial design and operation. For example, our process can be conducted at reflux temperatures thus avoiding expensive refrigeration equipment. Also the calcium can be removed from the system in a leisurely fashion thereby eliminating the exacting control required in the anhydrous systems. Such matters are of extreme importance commercially.

One preferred mode of operation of our invention is best described in connection with separating calcium from a calcium-sodium sludge obtained in a manner given heretofore, although it is understood that our process is applicable to other mixtures of sodium and calcium. The alcohol, premixed with the desired amount of water, is charged to a reaction vessel equipped with a suitable agitator, a reflux condenser, and means for heating or cooling the vessel and its contents as desired. The sludge is added at a rate compatible with the capacity of the reflux condenser. The reaction is conducted at reflux temperature until all the sodium is reacted as evidenced by cessation of hydrogen evolution. The liberated calcium crystals are allowed to settle and the supernatant liquid is withdrawn and sent to an evaporator where the solid sodium alcoholate is recovered. The calcium is then withdrawn from the reaction vessel, filtered, washed to remove the mother liquor and then dried in an inert atmosphere.

In all examples given herein the parts and percentages given are by weight. Also the yields of calcium are the per cent by weight based on the calcium charged to the reaction vessel. Further, the pressures are atmospheric.

Our invention can be best understood by referring to the following detailed working examples.

A mixture of 196 parts of methyl alcohol and 4 parts of water were charged to the reaction vessel. The temperature of the alcohol was raised to reflux temperature and 10 parts of sodium-calcium sludge containing 64.5% sodium, 24.5% calcium, 2% sodium and calcium chlorides and 9% sodium and calcium oxides were added over a period of 5 minutes, during which time refluxing and agitation was maintained. Agitation and refluxing were continued for at least ten minutes, the temperature being that obtained under refluxing conditions which varies during the operation between about 65° C., the boiling point of the alcohol water mixture, and 67° C., the boiling point of the reaction solution. Then the reaction mass was cooled by diluting with 150 parts of the methyl alcohol-water mixture. The liberated calcium was allowed to settle, the alcohol solution of soluble reaction products decanted, and the slurry of calcium crystals filtered. Finally, the product was washed and dried in an inert atmosphere. About 1.85 parts of calcium, or 76% of the calcium contained in the sludge charged was recovered.

In another operation, 10 parts of the sludge were treated with a mixture containing 196 parts of ethyl alcohol and 4 parts of water while maintaining the conditions of operation the same except for the higher reflux temperature which varied between about 80° C. and 81° C.; the reaction time was 4 minutes. In this operation a 90% yield of calcium, based on the amount of calcium charged in the sludge, was obtained.

Similarly, when 5 parts of the sludge was reacted with a mixture of 0.6 part of water and 199.4 parts of isopropyl alcohol at the reflux temperature, between 82° C. and 83° C., for 30 minutes, a 97% yield of calcium was obtained. Also, when 5 parts of sludge were added gradually to a mixture containing 199.6 parts of tertiary butyl alcohol and 0.4 part of water, and the solution maintained at reflux temperature for about 50 minutes, a 87% yield of calcium was obtained.

It is believed that the water in our process reacts with a small amount of the calcium forming an insoluble coating of calcium hydroxide which protects the remaining calcium from further reaction. Thus the calcium can be readily recovered from the reaction products. Furthermore, by controlling the amount of water in accordance with our invention, the reaction of the sodium with water is minimized, thereby obtaining a substantial yield of sodium alcoholate.

The amount of water used with the lower alcohols for treating mixtures of sodium and calcium varies generally between 0.1 to 50% depending upon the particular alcohol used. The preferred amount for each alcohol varies and in general the higher the molecular weight of the alcohol the less water should be employed. For example, we have found that the preferred amounts of water for use with methyl, ethyl, isopropyl and tertiary butyl alcohols are within the ranges of about 0.3 to 15%, 0.1 to 10%, 0.05 to 5.0%, and 0.01 to 2.0%, respectively, based on the amount of alcohol employed. Good recoveries of calcium are obtained within the above ranges. Furthermore, when the water is maintained within the above limits, substantial yields of sodium alcoholates are obtained. The optimum recovery of calcium for methyl, ethyl, isopropyl and tertiary butyl alcohols is obtained when the water contents of the alcohols are about 2%, 1-3%, 0.3% and 0.2%, respectively, although good recoveries are obtained with different amounts of water within the above ranges. With methyl alcohol substantial recoveries of calcium have been obtained up to 50% water.

In general our process is conducted at relatively low pressures and good results are obtained at atmospheric pressure. Our process should operate so that the sodium reaction product remains dissolved in the liquid phase and therefore the temperature and pressure and the amount of sludge should be controlled accordingly. Preferably the temperature is maintained at reflux temperature because by so doing expensive cooling or refrigeration is avoided. However, it is to be understood that temperatures below reflux can be used. Temperatures as low as 0° C. have been successfully employed. Actually slightly better results are obtained at lower temperatures but in general the improvement does not warrant such use owing to the increased expense.

The ratio of alcohol-water mixture to calcium-sodium mixture is not critical except that sufficient alcohol should be used to keep the alcoholate product in solution until the calcium is removed. To accomplish this, the ratio should be maintained between 10–40 parts of alcohol-water mixture to 1 part of sodium-calcium mixture.

Our process is not limited to the addition of water as such. Other materials which produce water in situ can be added to the system. In general such materials are alcohol-soluble bases, among which are; alkali metal bases such as the hydroxides of sodium, calcium, rubidium, caesium and lithium; ammonium hydroxide; and quaternary ammonium bases such as tetramethylammonium hydroxide, tetraethylammonium hydroxide, ethyl trimethylammonium hydroxide, benzyl trimethylammonium hydroxide, phenyl trimethylammonium hydroxide and dibenzyl dimethylammonium hydroxide. Other examples of alcohol-soluble bases suitable for use in our process will occur to those skilled in the art.

Such alcohol-soluble bases react with the alcohol in the system producing water in situ. To illustrate, when sodium hydroxide and methyl alcohol are used, they react according to the following equation:

$$NaOH + CH_3OH \rightleftharpoons NaOCH_3 + H_2O$$

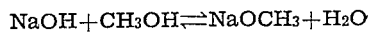

Such materials which are soluble in and react with alcohols forming water have been successfully employed in our process. The amount of such material used depends on the nature of the base, the reaction conditions and the speed at which water is formed in the reaction equilibrium. In general the reaction should yield an amount of water conforming to the limits heretofore set forth.

To illustrate, an operation was conducted similar to the working examples given previously, in which 20 parts of sodium-calcium sludge were added to 200 parts of a mixture containing 180 parts of methyl alcohol and 20 parts of anhydrous sodium hydroxide. The reaction was conducted at the reflux temperature of the solution for about 37 minutes and the calcium recovered as previously described. An 88% yield of calcium based on the amount charged in the sludge was obtained. Similarly, when 10 parts of sludge were added to a mixture of 192.2 parts of methyl alcohol and 7.8 parts of ammonium hydroxide and the reaction mixture refluxed for 30 minutes, approximately a 90% yield of calcium was obtained. Likewise, when the same amount of sludge was added to a mixture of 184.4 parts of methyl alcohol and 15.6 parts of benzyltrimethylammonium hydroxide at a reaction temperature of 10° C., a calcium yield of about 89% was obtained.

Thus we have shown that calcium can be separated from sodium-calcium mixtures in high yields by reaction with lower aliphatic alcohols in the presence of water, either when the water is added directly to the alcohol or when it is formed in situ by reaction of the alcohol with another substance.

We claim:

1. A process of recovering calcium metal from admixture with sodium metal comprising treating said mixture with a lower aliphatic alcohol in the presence of water in an amount less than 50 per cent by weight based on the amount of alcohol used and then separating the undissolved calcium metal from the reaction mixture.

2. A process of recovering calcium metal from a mixture with sodium metal comprising treating said mixture with methyl alcohol in the presence of water in amount between approximately 0.3 and 15 per cent by weight based on the methyl alcohol used, under such conditions that substantially all of the sodium is reacted with the methyl alcohol and the resulting methyl alcoholate is dissolved in the unreacted methyl alcohol, and then separating calcium therefrom.

3. A process for the recovery of calcium from sludges in which it occurs in admixture with sodium comprising treating said sludge with a lower aliphatic alcohol containing less than about 2 per cent by weight water under such conditions that substantially all of the sodium is reacted with the alcohol and the resulting alcoholate is dissolved in the unreacted alcohol, and then separating the calcium therefrom.

4. A process of recovering calcium from admixture with sodium comprising treating said mixture with a lower aliphatic alcohol having from 1 to 5 carbon atoms inclusive, in the presence of water in an amount less than 15 per cent by weight based on the alcohol, controlling the temperature and pressure so that the sodium reaction product remains dissolved in the liquid phase, subjecting the reaction mixture to these conditions for sufficient time to react substantially all of the sodium, and then removing the thus liberated calcium from the reaction mixture.

5. A process for the recovery of calcium from admixture with sodium comprising treating said mixture with an aliphatic alcohol selected from the group consisting of methyl, ethyl, isopropyl and tertiary-butyl in the presence of water in an amount by weight based on the alcohol between 0.3 and 15 per cent for methyl, 0.1 to 10 per cent for ethyl, 0.05 and 5 per cent for isopropyl and 0.01 to 2 per cent for tertiary-butyl under such conditions that substantially all the sodium is reacted with the alcohol and the resulting alcoholate is dissolved in the unreacted alcohol, and then separating the calcium therefrom.

EUGENE F. HILL.
HAROLD SOROOS.

REFERENCES CITED

The following references are of record in the file of this patent:

"Handbook of Chemistry and Physics," 28th ed., published by Chemical Rubber Publishing Co. (1944), pages 358, 359, 454, and 455.

Thorpe's "Dictionary of Applied Chemistry," vol. 2, published by Longmans, Green and Co., 1938, page 205.